United States Patent
Vasyltsov et al.

(10) Patent No.: US 12,039,288 B2
(45) Date of Patent: Jul. 16, 2024

(54) METHOD AND APPARATUS WITH DATA PROCESSING

(71) Applicant: Samsung Electronics Co., Ltd., Suwon-si (KR)

(72) Inventors: Ihor Vasyltsov, Suwon-si (KR); Wooseok Chang, Seoul (KR); Youngnam Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 17/072,692

(22) Filed: Oct. 16, 2020

(65) Prior Publication Data

US 2021/0117155 A1 Apr. 22, 2021

Related U.S. Application Data

(60) Provisional application No. 62/915,846, filed on Oct. 16, 2019.

(30) Foreign Application Priority Data

May 6, 2020 (KR) .................... 10-2020-0054050

(51) Int. Cl.
*G06F 7/498* (2006.01)
*G06F 1/03* (2006.01)
*G06F 17/10* (2006.01)

(52) U.S. Cl.
CPC .............. *G06F 7/4988* (2013.01); *G06F 1/03* (2013.01); *G06F 17/10* (2013.01)

(58) Field of Classification Search
CPC .............. G06F 7/4988; G06F 7/57–575; G06F 7/4973; G06F 7/4917; G06F 7/535;
(Continued)

(56) References Cited

U.S. PATENT DOCUMENTS 10,032,067 B2   7/2018   El-Khamy et al.
10,818,347 B2  10/2020   Vasyltsov et al.
(Continued)

FOREIGN PATENT DOCUMENTS

KR   10-2019-0062129 A   6/2019

OTHER PUBLICATIONS

H. Xu et al., "FPGA Based Real-Time Multi-Face Detection System With Convolution Neural Network," 2019 8th International Symposium on Next Generation Electronics (ISNE), 2019, pp. 1-3, doi: 10.1109/ISNE.2019.8896551. (Year: 2019).*
(Continued)

*Primary Examiner* — Andrew Caldwell
*Assistant Examiner* — Carlo Waje
(74) *Attorney, Agent, or Firm* — NSIP Law

(57) ABSTRACT

A processor-implemented data processing method includes: normalizing input data of an activation function comprising a division operation; determining dividend data corresponding to a dividend of the division operation by reading, from a memory, a value of a first lookup table addressed by the normalized input data; determining divisor data corresponding to a divisor of the division operation by accumulating the dividend data; and determining output data of the activation function corresponding to an output of the division operation obtained by reading, from the memory, a value of a second lookup table addressed by the dividend data and the divisor data.

27 Claims, 17 Drawing Sheets

(58) Field of Classification Search
CPC ............ G06F 1/03–0356; G06F 17/10; G06F 2207/5354; G06N 3/0481; G06N 3/048
See application file for complete search history.

(56) References Cited

U.S. PATENT DOCUMENTS

| | | | |
|---|---|---|---|
| 10,949,498 B1* | 3/2021 | Enumula | G06F 7/556 |
| 2015/0006600 A1* | 1/2015 | Cho | G06F 7/507 708/235 |
| 2016/0313976 A1* | 10/2016 | Dibrino | G06F 7/52 |
| 2016/0379115 A1 | 12/2016 | Burger et al. | |
| 2017/0103311 A1 | 4/2017 | Henry et al. | |
| 2018/0018146 A1* | 1/2018 | Ebergen | G06F 1/03 |
| 2018/0137647 A1 | 5/2018 | Li et al. | |
| 2018/0158189 A1 | 6/2018 | Yedla et al. | |
| 2018/0260379 A1 | 9/2018 | Yu et al. | |
| 2018/0307897 A1 | 10/2018 | El-Khamy et al. | |
| 2018/0336465 A1 | 11/2018 | Kim et al. | |
| 2019/0114555 A1* | 4/2019 | Akerib | G06N 3/0481 |
| 2019/0122654 A1 | 4/2019 | Song et al. | |
| 2019/0156817 A1 | 5/2019 | Li et al. | |
| 2019/0164043 A1 | 5/2019 | Litvak et al. | |
| 2019/0369962 A1* | 12/2019 | Viswanathan Pillai | G06F 7/548 |
| 2020/0013451 A1* | 1/2020 | Son | G11C 11/4091 |
| 2021/0034644 A1* | 2/2021 | Li | G06F 16/284 |

OTHER PUBLICATIONS

S. Mirsamadi, E. Barsoum and C. Zhang, "Automatic speech emotion recognition using recurrent neural networks with local attention," 2017 IEEE International Conference on Acoustics, Speech and Signal Processing (ICASSP), 2017, pp. 2227-2231, doi: 10.1109/ICASSP.2017.7952552. (Year: 2017).*

I. Vasyltsov et al., "Efficient Softmax Approximation for Deep Neural Networks with Attention Mechanism" https://doi.org/10.48550/arXiv.2111.10770 (Year: 2021).*

Zichang Tan, et al., "Age Estimation Based on a Single Network with Soft Softmax of Aging Modeling", Center for Biometrics and Security Research & National Laboratory of Pattern Recognition, Institute of Automation, Chinese Academy of Sciences, Beijing, China (15 pages in English).

Xue Geng, et al., "Hardware-aware Softmax Approximation for Deep Neural Networks", I2R, A*STAR, Singapore \IME, A*STAR, Singapore, School of CSE, NTU, Singapore (16 pages in English).

Vaswani, A. et al., "Attention Is All You Need", Cs.CL, Dec. 6, 2017 (15 pages in English).

Ho-Gyeong Kim, et al., Knowledge Distillation Using Output Errors for Self-attention End-to-end Models, Samsung Advanced Institute of Technology, Samsung Electronics, South Korea (5 pages in English).

European Search Report dated Mar. 15, 2021 in counterpart EP Patent Application No. 20202003.8 (9 pages in English).

Yuan, Bo. "Efficient hardware architecture of softmax layer in deep neural network." 2016 29th IEEE International System-on-Chip Conference (SOCC). IEEE, 2016.

Chughtai, Muhammad Kamran, et al. "A high speed and resource efficient approximation of softmax loss function." 2019 16th International Bhurban Conference on Applied Sciences and Technology (IBCAST). IEEE, Jan. 2019.

Marchisio, Alberto, Muhammad Abdullah Hanif, and Muhammad Shafique. "Capsacc: An efficient hardware accelerator for capsulenets with data reuse." 2019 Design, Automation & Test in Europe Conference & Exhibition (DATE). IEEE, Mar. 2019.

Dong, Xiao, Xiaolei Zhu, and De Ma. "Hardware Implementation of Softmax Function Based on Piecewise LUT." 2019 IEEE International Workshop on Future Computing (IWOFC. IEEE, Dec. 2019.

Alabassy, Bassma, Mona Safar, and M. Watheq El-Kharashi. "A High-Accuracy Implementation for Softmax Layer in Deep Neural Networks." 2020 15th Design & Technology of Integrated Systems in Nanoscale Era (DTIS). IEEE, Apr. 2020.

* cited by examiner

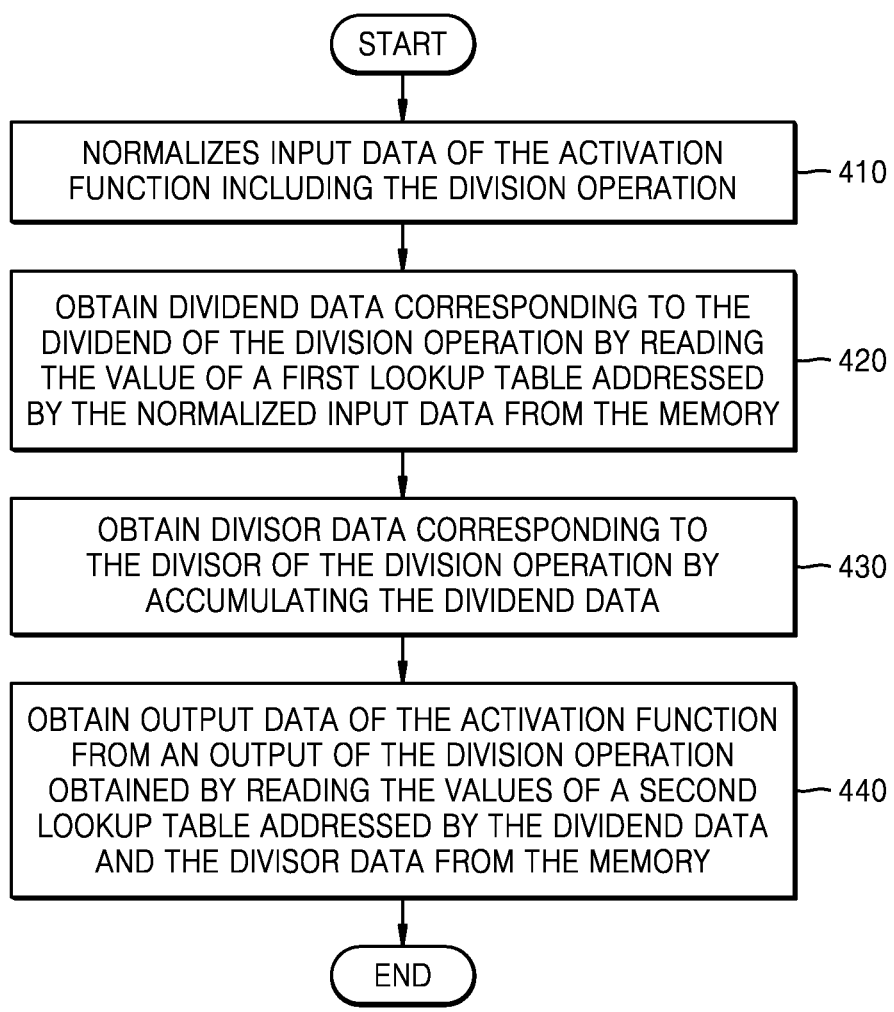

FIG. 6

| NPU precision | LUT precision | Table | Length (Rows) | Length (Columns) | Size (bits) | Size (Byte) |
|---|---|---|---|---|---|---|
| FP32 | FP10  610 | 1D_LUT_1x31 | 1 | 31 | 310 | 39 |
| | | 1D_LUT_1x61 | 1 | 61 | 610 | 77 |
| | | 1D_LUT_1x101 | 1 | 101 | 1010 | 127 |
| | | 2D_LUT_11x20 | 11 | 20 | 2200 | 275 |
| | | 2D_LUT_11x40 | 11 | 40 | 4400 | 550 |
| | | 2D_LUT_11x60 | 11 | 60 | 6600 | 825 |
| | | 2D_LUT_11x100 | 11 | 100 | 11000 | 1375 |
| | | 2D_LUT_101x40 | 101 | 40 | 40400 | 5050 |
| INT16 | INT16  620 | 1D_LUT_1x101_int16 | 1 | 101 | 1616 | 202 |
| | | 2D_LUT_11x60_int16 | 11 | 60 | 10560 | 1320 |
| INT8 | INT8  630 | 1D_LUT_1x101_int8 | 1 | 101 | 808 | 101 |
| | | 2D_LUT_11x60_int8 | 11 | 60 | 5280 | 660 |
| UINT8 | UINT8  640 | 1D_LUT_1x101_uint8 | 1 | 101 | 808 | 101 |
| | | 2D_LUT_11x60_uint8 | 11 | 60 | 5280 | 660 |

600

1D_LUT_1x101_uint8=[0, 2, 2, 2, 2, 2, 2, 2, 3, 3, 3, 3, ···, 185, 195, 205, 215, 226, 238, 250]

2D_LUT_11x60_uint8=[[0, 25, 50, 75, 100, 125, 150, 175, 200, 225, 250]',
[0 13, 25, 38, 50, 63, 75, 88, 100, 113, 125]',
[0, 8, 17, 25, 33, 42, 50, 58, 67, 75, 83]',
[0, 6, 13, 19, 25, 31, 38, 44, 50, 56, 63]', ···,
[0, 0, 1, 1, 2, 2, 3, 3, 3, 4, 4]',
[0, 0, 1, 1, 2, 2, 3, 3, 3, 4, 4]']

FIG. 10

| | 2nd LUT | 1st LUT | LibriSpeech, 1000 short samples | Commercial, ~2000 samples | Commercial, short samples |
|---|---|---|---|---|---|
| | | | WPSR=7.81 | WPSR=6.12 | WPSR=4.59 |
| | | | WER, % | | |
| 1010 → | Reference (FP64) | | 4.30 | 4.61 | 2.86 |
| 1020 → | 40x11 | 1x31 | 4.76 | 5.13 | 3.18 |
| 1030 → | 60x11 | 1x61 | 4.83 | 5.09 | 3.06 |
| 1040 → | 60x11 | 1x101 | 4.47 | 4.70 | 2.81 |
| | | | SER, % | | |
| 1010 → | Reference (FP64) | | 22.20 | 16.75 | 8.67 |
| 1020 → | 40x11 | 1x31 | 23.60 | 17.58 | 9.11 |
| 1030 → | 60x11 | 1x61 | 24.20 | 17.53 | 8.78 |
| 1040 → | 60x11 | 1x101 | 23.30 | 16.93 | 8.11 |

FIG. 11

| Cases | 1st LUT | 2ND LUT | Size, Bytes | dWER, % | dWER (short), % |
|---|---|---|---|---|---|
| full_int16 | 1D_LUT_1x101_int16 | 2D_LUT_11x60_int16 | 1522 | 0.12 | −0.07 |
| full_uint8 | 1D_LUT_1x101_uint8 | 2D_LUT_11x60_uint8 | 761 | 0.24 | −0.12 |
| full_int8 | 1D_LUT_1x101_int8 | 2D_LUT_11x60_int8 | 761 | 0.26 | −0.03 |
| mix_16_8 | 1D_LUT_1x101_int16 | 2D_LUT_11x60_int8 | 862 | 0.32 | −0.07 |
| mix_16_8 | 1D_LUT_1x101_int16 | 2D_LUT_11x60_int8 | 862 | 0.31 | −0.10 |
| mix_16_8 | 1D_LUT_1x101_int16 | 2D_LUT_11x60_uint8 | 862 | 0.23 | −0.22 |
| mix_16_8 | 1D_LUT_1x101_int16 | 2D_LUT_11x60_uint8 | 862 | 0.16 | −0.22 |
| mix_16_8 | 1D_LUT_1x101_int16 | 2D_LUT_11x40_uint8 | 642 | 0.26 | −0.15 |
| mix_16_8 | 1D_LUT_1x101_int16 | 2D_LUT_11x35_uint8 | 587 | 0.15 | −0.14 |
| mix_16_8 | 1D_LUT_1x101_int16 | 2D_LUT_11x30_uint8 | 532 | 0.78 | −0.22 |
| mix_16_8 | 1D_LUT_1x101_int16 | 2D_LUT_11x25_uint8 | 477 | 1.19 | −0.15 |

FIG. 15

| | | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| 0000 | 0 | 0 | 0 | 0 | 0 | 0 | 0 | 0 | 0 | 0 | 0 | 0 | 0 | 0 | 0 | 0 | 0 |
| 0001 | 1 | 0 | 1 | 2 | 3 | 4 | 5 | 6 | 7 | 8 | 9 | 10 | 11 | 12 | 13 | 14 | 15 |
| 0010 | 2 | 0 | 2 | 4 | 6 | 8 | 10 | 12 | 14 | 16 | 18 | 20 | 22 | 24 | 26 | 28 | 30 |
| 0011 | 3 | 0 | 3 | 6 | 9 | 12 | 15 | 18 | 21 | 24 | 27 | 30 | 33 | 36 | 39 | 42 | 45 |
| 0100 | 4 | 0 | 4 | 8 | 12 | 16 | 20 | 24 | 28 | 32 | 36 | 40 | 44 | 48 | 52 | 56 | 60 |
| 0101 | 5 | 0 | 5 | 10 | 15 | 20 | 25 | 30 | 35 | 40 | 45 | 50 | 55 | 60 | 65 | 70 | 75 |
| 0110 | 6 | 0 | 6 | 12 | 18 | 24 | 30 | 36 | 42 | 48 | 54 | 60 | 66 | 72 | 78 | 84 | 90 |
| 0111 | 7 | 0 | 7 | 14 | 21 | 28 | 35 | 42 | 49 | 56 | 63 | 70 | 77 | 84 | 91 | 98 | 105 |
| 1000 | 8 | 0 | 8 | 16 | 24 | 32 | 40 | 48 | 56 | 64 | 72 | 80 | 88 | 96 | 104 | 112 | 120 |
| 1001 | 9 | 0 | 9 | 18 | 27 | 36 | 45 | 54 | 63 | 72 | 81 | 90 | 99 | 108 | 117 | 126 | 135 |
| 1010 | 10 | 0 | 10 | 20 | 30 | 40 | 50 | 60 | 70 | 80 | 90 | 100 | 110 | 120 | 130 | 140 | 150 |
| 1011 | 11 | 0 | 11 | 22 | 33 | 44 | 55 | 66 | 77 | 88 | 99 | 110 | 121 | 132 | 143 | 154 | 165 |
| 1100 | 12 | 0 | 12 | 24 | 36 | 48 | 60 | 72 | 84 | 96 | 108 | 120 | 132 | 144 | 156 | 168 | 180 |
| 1101 | 13 | 0 | 13 | 26 | 39 | 52 | 65 | 78 | 91 | 104 | 117 | 130 | 143 | 156 | 169 | 182 | 195 |
| 1110 | 14 | 0 | 14 | 28 | 42 | 56 | 70 | 84 | 98 | 112 | 126 | 140 | 154 | 168 | 182 | 196 | 210 |
| 1111 | 15 | 0 | 15 | 30 | 45 | 60 | 75 | 90 | 105 | 120 | 135 | 150 | 165 | 180 | 195 | 210 | 225 |

FIG. 16

| | 0000 | 0001 | 0010 | 0011 | 0100 | 0101 | 0110 | 0111 | 1000 | 1001 | 1010 | 1011 | 1100 | 1101 | 1110 | 1111 |
| --- | --- | --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 | 14 | 15 |
| 0000 / 0 | | | | | | | | | | | | | | | | |
| 0001 / 1 | | 1 | | | | | | | | | | | | | | |
| 0010 / 2 | | 2 | 4 | | | | | | | | | | | | | |
| 0011 / 3 | | 3 | 6 | 9 | | | | | | | | | | | | |
| 0100 / 4 | | 4 | 8 | 12 | 16 | | | | | | | | | | | |
| 0101 / 5 | | 5 | 10 | 15 | 20 | 25 | | | | | | | | | | |
| 0110 / 6 | | 6 | 12 | 18 | 24 | 30 | 36 | | | | | | | | | |
| 0111 / 7 | | 7 | 14 | 21 | 28 | 35 | 42 | 49 | | | | | | | | |
| 1000 / 8 | | 8 | 16 | 24 | 32 | 40 | 48 | 56 | 64 | | | | | | | |
| 1001 / 9 | | 9 | 18 | 27 | 36 | 45 | 54 | 63 | 72 | 81 | | | | | | |
| 1010 / 10 | | 10 | 20 | 30 | 40 | 50 | 60 | 70 | 80 | 90 | 100 | | | | | |
| 1011 / 11 | | 11 | 22 | 33 | 44 | 55 | 66 | 77 | 88 | 99 | 110 | 121 | | | | |
| 1100 / 12 | | 12 | 24 | 36 | 48 | 60 | 72 | 84 | 96 | 108 | 120 | 132 | 144 | | | |
| 1101 / 13 | | 13 | 26 | 39 | 52 | 65 | 78 | 91 | 104 | 117 | 130 | 143 | 156 | 169 | | |
| 1110 / 14 | | 14 | 28 | 42 | 56 | 70 | 84 | 98 | 112 | 126 | 140 | 154 | 168 | 182 | 196 | |
| 1111 / 15 | | 15 | 30 | 45 | 60 | 75 | 90 | 105 | 120 | 135 | 150 | 165 | 180 | 195 | 210 | 225 |

FIG. 17

| | | 0000 | 0001 | 0010 | 0011 | 0100 | 0101 | 0110 | 0111 | 1000 | 1001 | 1010 | ... | 11111101 | 11111110 | 11111111 |
|---|---|---|---|---|---|---|---|---|---|---|---|---|---|---|---|---|
| | | 0 | 1 | 2 | 3 | 4 | 5 | 6 | 7 | 8 | 9 | 10 | ... | 253 | 254 | 255 |
| 0000 | 0 | | | | | | | | | | | | | | | |
| 0001 | 1 | | 1 | | | | | | | | | | | | | |
| 0010 | 2 | | 2 | 4 | | | | | | | | | | | | |
| 0011 | 3 | | 3 | 6 | 9 | | | | | | | | | | | |
| 0100 | 4 | | 4 | 8 | 12 | 16 | | | | | | | | | | |
| 0101 | 5 | | 5 | 10 | 15 | 20 | 25 | | | | | | | | | |
| 0110 | 6 | | 6 | 12 | 18 | 24 | 30 | 36 | | | | | | | | |
| 0111 | 7 | | 7 | 14 | 21 | 28 | 35 | 42 | 49 | | | | | | | |
| 1000 | 8 | | 8 | 16 | 24 | 32 | 40 | 48 | 56 | 64 | | | | | | |
| 1001 | 9 | | 9 | 18 | 27 | 36 | 45 | 54 | 63 | 72 | 81 | | | | | |
| 1010 | 10 | | 10 | 20 | 30 | 40 | 50 | 60 | 70 | 80 | 90 | 100 | | | | |
| ... | ... | | ... | ... | ... | ... | ... | ... | ... | ... | ... | ... | | | | |
| 11111101 | 253 | | 253 | 506 | 759 | 1012 | 1265 | 1518 | 1771 | 2024 | 2277 | 2530 | 2783 | 3036 | 3289 | 3542 | 3795 |
| 11111110 | 254 | | 254 | 508 | 762 | 1016 | 1270 | 1524 | 1778 | 2032 | 2286 | 2540 | 2794 | 3048 | 3302 | 3556 | 3810 |
| 11111111 | 255 | | 255 | 510 | 765 | 1020 | 1275 | 1530 | 1785 | 2040 | 2295 | 2550 | 2805 | 3060 | 3315 | 3570 | 3825 |

METHOD AND APPARATUS WITH DATA PROCESSING

CROSS-REFERENCE TO RELATED APPLICATIONS

This application claims the benefit under 35 USC § 119(e) of U.S. Provisional Patent Application No. 62/915,846, filed on Oct. 16, 2019, in the United States Patent and Trademark Office, and claims the benefit under 35 USC § 119(a) of Korean Patent Application No. 10-2020-0054050, filed on May 6, 2020, in the Korean Intellectual Property Office, the entire disclosures of which are incorporated herein by reference for all purposes.

BACKGROUND

1. Field

The following description relates to methods and apparatuses with data processing.

2. Description of Related Art

A neural network may be a computing system implemented with reference to a computational architecture. Various kinds of electronic systems are used to analyze data and extract valid information by using a data processing apparatus.

The data processing apparatus may perform a large amount of data computations.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a processor-implemented data processing method includes: normalizing input data of an activation function comprising a division operation; determining dividend data corresponding to a dividend of the division operation by reading, from a memory, a value of a first lookup table addressed by the normalized input data; determining divisor data corresponding to a divisor of the division operation by accumulating the dividend data; and determining output data of the activation function corresponding to an output of the division operation obtained by reading, from the memory, a value of a second lookup table addressed by the dividend data and the divisor data.

The normalizing may include normalizing the input data such that a maximum value of the normalized input data is 0.

The determining of the output data may include: determining a column-index addressing columns of the second lookup table based on a value of the dividend data; determining a row-index addressing rows of the second lookup table based on a value of the divisor data; and reading, from the memory, the value of the second lookup table addressed by the column-index and the row-index.

The determining of the divisor data may include accumulating the dividend data using an accumulator, and the determining of the row-index may include determining the row-index from a value indicated by most significant bits of the accumulator.

The determining of the row-index may include determining a number of the most significant bits based on a value of a log of a total number of rows of the second lookup table with a base of 2.

The determining of the number of the most significant bits may include adding 1 to a specific number of the value of the log.

The determining of the output data may include reading a value of the second lookup table by selecting a word line of the memory addressed by the row-index.

The method may include: determining a precision for processing data; and selecting the first lookup table and the second lookup table corresponding to the precision from among a plurality of previously generated lookup tables.

The selecting of the first lookup table and the second lookup table may include: selecting the first lookup table and the second lookup table such that the first lookup table and the second lookup table correspond to different precisions.

The activation function may include a Softmax function.

A non-transitory computer-readable storage medium may store instructions that, when executed by a processor, configure the processor to perform the method.

In another general aspect, a data processing apparatus includes: a memory; and a processor configured to: normalize input data of an activation function comprising a division operation; determine dividend data corresponding to a dividend of the division operation by reading, from the memory, a value of a first lookup table addressed by the normalized input data;

determine divisor data corresponding to a divisor of the division operation by accumulating the dividend data; and determine output data of the activation function corresponding to an output of the division operation obtained by reading, from the memory, a value of a second lookup table addressed by the dividend data and the divisor data.

For the normalizing, the processor may be configured to normalize the input data such that a maximum value of the normalized input data is 0.

For the determining of the output data, the processor may be configured to: determine a column-index addressing columns of the second lookup table based on a value of the dividend data; determine a row-index addressing rows of the second lookup table based on a value of the divisor data; and read, from the memory, the value of the second lookup table addressed by the column-index and the row-index.

The apparatus may include: an accumulator configured to accumulate the dividend data, wherein, for the determining of the row-index, the processor may be configured to determine the row-index from a value indicated by most significant bits of the accumulator.

For the determining of the row-index, the processor may be configured to determine the number of the most significant bits based on a value of a log of a total number of rows of the second lookup table with a base of 2.

The memory may include dynamic random access memory (DRAM) in which the second lookup table is stored, and for the determining of the output data, the processor may be configured to read a value of the second lookup table by selecting a word line of the DRAM addressed by the row-index.

The processor may be configured to: determine a precision for processing data; and select the first lookup table and the second lookup table corresponding to the precision from among a plurality of previously generated lookup tables.

For the selecting of the first lookup table and the second lookup table, the processor may be configured to select the first lookup table and the second lookup table such that the first lookup table and the second lookup table correspond to different precisions.

The activation function may include a Softmax function.

In another general aspect, a processor-implemented data processing method includes: determining dividend data corresponding to a dividend of an activation function by reading, from a memory, a value of a first lookup table based on input data of the activation function; determining divisor data corresponding to a divisor of the activation function by accumulating the dividend data; and determining output data corresponding to an output of the activation function by reading, from the memory, a value of a second lookup table based on the dividend data and the divisor data.

The method may include: normalizing the input data, wherein the determining of the dividend data may include reading, from the memory, the value of the first lookup table addressed by the normalized input data.

The processor may be configured to perform automatic speech recognition based on the determined output data, and the activation function may correspond to an attention function.

In another general aspect, a processor-implemented data processing method includes: normalizing input data of an activation function comprising a dividend and a divisor; determining dividend data by reading, from a first lookup table of one or more memories, a value of a column-index corresponding to a value of the normalized input data; determining divisor data by accumulating the dividend data; and determining output data of the activation function by reading, from a second lookup table of the one or more memories, a value of a column-index corresponding to the value of the normalized input data and of a row-index corresponding to a value of the divisor data.

The dividend data may be within the range of 0 to 1.

The first lookup table and the second lookup table may be determined from among a plurality of generated lookup tables, based on a precision with which a processor may be configured to implement the activation function.

The precision may be any one of floating point 10, floating point 32, integer 8, integer 16, and unsigned integer 8.

Other features and aspects will be apparent from the following detailed description, the drawings, and the claims.

BRIEF DESCRIPTION OF THE DRAWINGS

FIG. 4 illustrates a method of processing data according to one or more embodiments.

FIG. 6 illustrates a precision of a lookup table according to one or more embodiments.

FIG. 10 illustrates an accuracy of an operation of a data processing apparatus according to one or more embodiments.

FIG. 11 illustrates an accuracy of an operation of a data processing apparatus according to an embodiment

FIG. 15 illustrates a method used by a data processing apparatus to perform a multiplication operation according to one or more embodiments.

FIG. 16 illustrates a method used by a data processing apparatus to perform a multiplication operation according to one or more embodiments.

FIG. 17 illustrates a method used by a data processing apparatus to perform a multiplication operation according to one or more embodiments.

Figure 1:
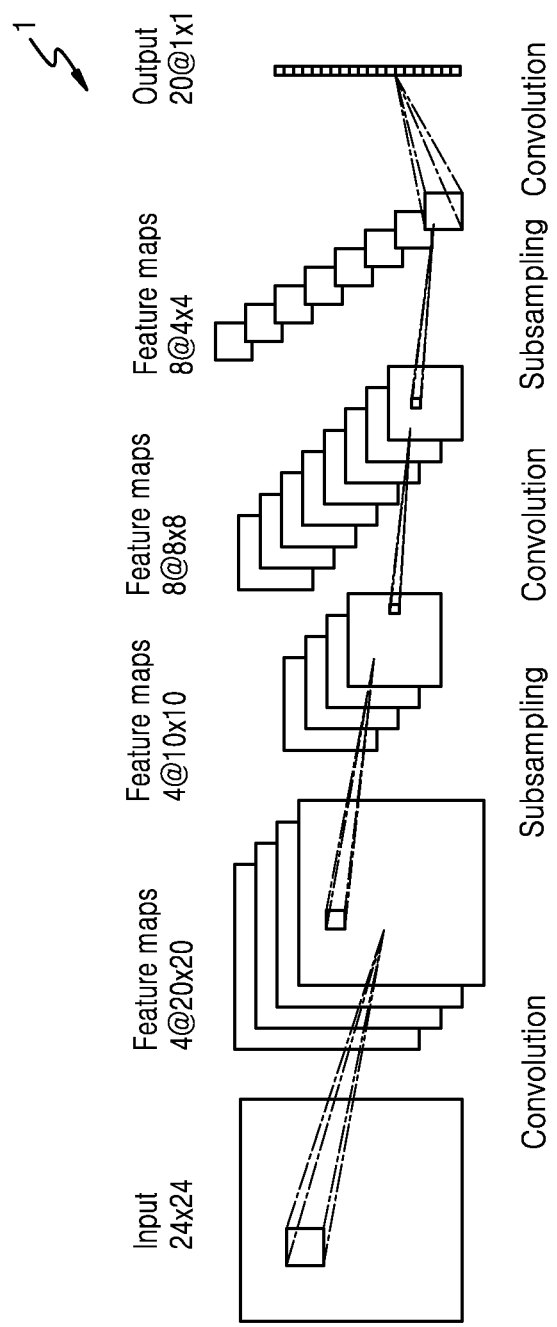
FIG. 1 illustrates an architecture of a neural network according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Reference will now be made in detail to embodiments, examples of which are illustrated in the accompanying drawings, wherein like reference numerals refer to like elements throughout. In this regard, the one or more embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the present disclosure are selected based on general terms currently widely used in consideration of functions regarding the present disclosure, but the terms may vary according to the intention of those of ordinary skill in the art after an understanding of the present disclosure, precedents, or new technology in the art. Also, some terms may be arbitrarily selected by the applicant, and in this case, the meaning of the selected terms will be described in the detailed description of the present disclosure. Thus, the terms used herein should not be construed based on only the names of the terms but should be construed based on the meaning of the terms together with the description throughout the present disclosure.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The term used in the embodiments such as "unit", etc., indicates a unit for processing at least one function or operation, and where the unit is hardware or a combination of hardware and software.

Hereinafter, the present disclosure will now be described more fully with reference to the accompanying drawings. The disclosure may, however, be embodied in many different forms and should not be construed as being limited to the embodiments set forth herein.

FIG. 1 illustrates an architecture of a neural network 1 according to one or more embodiments.

Referring to FIG. 1, the neural network 1 may be implemented as a deep neural network (DNN) or an n-layer neural network. The DNN or the n-layer neural network may correspond to a convolutional neural network (CNN), a recurrent neural network (RNN), a deep belief network, a restricted Boltzmann machine, etc. For example, the neural network 1 may be implemented as a CNN, but is not limited thereto. FIG. 1 shows some convolutional layers in the CNN corresponding to the example of the neural network 1, but the CNN may further include a pooling layer and a fully connected layer in addition to the illustrated convolutional layers.

The neural network 1 may be implemented as a computing architecture having multiple layers including an input image layer, feature map generating layers, and an output data layer. In the neural network 1, when a convolution operation with a filter called a weight kernel and the input image is performed, output feature maps (or activation maps or convolved features) may be output. An activation function may be used in a process of generating the output feature maps. The generated output feature maps may be next input feature maps for a next convolution layer, and a convolution operation with a kernel of the next convolution layer may be performed on the next input feature maps, and new output feature maps may be output as a result of such convolution operation. As a result of performing such convolution operation repeatedly with respective kernels, a result of recognizing the characteristics of the input image through the neural network 1 may be finally output.

For example, when an image of a size of 24×24 pixels is input to the neural network 1 of FIG. 1, four channel feature maps of a size of 20×20 pixels may be output through a first convolution operation on the input image with a first kernel. Thereafter, the size of the respectively output feature maps may be incrementally reduced through respective convolution operations performed dependent on the output 20×20 feature maps with respective kernels, with a final illustrated convolution operation with a final kernel generating the illustrated final characteristics of a size of 1×1 pixel size. The neural network 1 may filter and output robust characteristics that may represent the entire image from the input image by respectively performing the convolution operations and a sub-sampling (or pooling) operations in various layers, and a recognition result with respect to the input image may be derived from the output final characteristics. Based on the above, it is understood that example embodiments discussed herein include embodiments with one or more, in various combinations, or all such layers, stages, edges, etc. in operations of the neural network 1.

Figure 2:
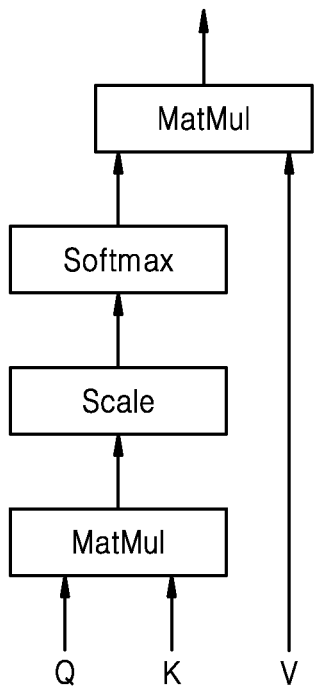
FIG. 2 illustrates a fragment of an end-to-end automatic speech recognition (ASR) model according to one or more embodiments.

FIG. 2 illustrates a fragment of an end-to-end automatic speech recognition (ASR) model according to one or more embodiments.

ASR may be a technology that transforms human speech into data that a computer is capable of interpreting using artificial intelligence (AI). An ASR model may be implemented based on a neural network. For example, the ASR model may be implemented based on DNN, recurrent neural network (RNN), etc. In addition, the ASR model may be implemented based on various algorithms such as a hidden Markov model (HMM).

An end-to-end ASR model may be an ASR model for directly mapping an input sequence obtained from speech into a sequence of words.

The end-to-end ASR model may be implemented based on an attention mechanism. The attention mechanism may map an input sequence to an output sequence using the dependency between the input sequence and the output sequence. The attention mechanism may be implemented using a method including, for example, a scaled dot-product attention function.

In the end-to-end ASR model, the scaled dot-product attention function may be processed by an operation module or a processing element (e.g., one or more processors). The scaled dot-product attention function may be a function for mapping a set of queries Q, keys K, and values V to an output, and may be expressed as Equation 1 below and shown in FIG. 2, for example.

$$\text{Attention}(Q, K, V) = \text{softmax}\left(\frac{QK^T}{\sqrt{d_k}}\right)V \quad \text{Equation 1}$$

In Equation 1, Q denotes a query matrix, K denotes a key matrix, V denotes a value matrix, and $d_k$ denotes a dimension of queries and keys (e.g., queries and keys of dimension $d_k$).

The relevance between the query and the key may be obtained (e.g., determined) from the dot-product of the query and the key. By scaling the dot-product of the query and the key to $\sqrt{d_k}$, a slight change in the output value of a Softmax function may be prevented. By multiplying the output value of the Softmax function by V, the higher the value has the relevance with the query, the greater the attention (Q,K,V)) may be obtained.

Figure 3:
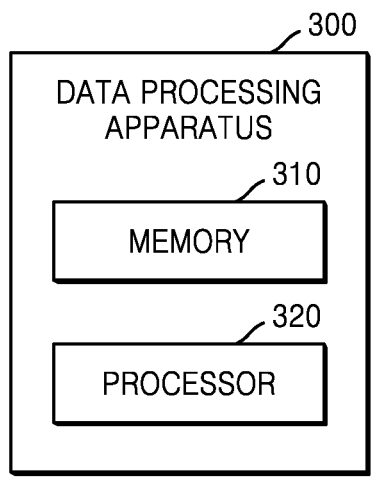
FIG. 3 illustrates a data processing apparatus according to one or more embodiments.

FIG. 3 is a configuration diagram illustrating a data processing apparatus 300 according to one or more embodiments.

Referring to FIG. 3, the data processing apparatus 300 may include a memory 310 and a processor 320 (e.g., one or more processors). In the data processing apparatus 300 of FIG. 3, components related to the present embodiments are illustrated, and it will be apparent after an understanding of the present disclosure that other components may be further included in the data processing apparatus 300 in addition to the components illustrated in FIG. 3.

The data processing apparatus 300 may be an apparatus that implements the neural network described above with reference to FIG. 1. In addition, the data processing apparatus 300 may be an apparatus that implements the fragment of the ASR model described above with reference to FIG. 2. For example, the data processing apparatus 300 may be implemented as, or with, various types of devices such as a personal computer (PC), a server device, a mobile device, an embedded device, etc. As a specific example, the data processing apparatus 300 may be or include a smart phone, a tablet device, an augmented reality (AR) device, an Internet of Things (IoT) device, an autonomous driving vehicle, robotics, a medical device, etc. that perform voice recognition, image recognition, and image classification using the neural network, but is not limited thereto. In addition, the data processing apparatus 300 may correspond to a dedicated hardware accelerator mounted on the above-described device, and may be a hardware accelerator such as a neural processing unit (NPU), a tensor processing unit (TPU), a neural engine, etc. which are dedicated modules for driving the neural network.

The memory 310 may store various kinds of data processed in the data processing apparatus 300. For example, the memory 310 may store data processed and data to be processed by the data processing apparatus 300. For example, the memory 310 may function as an accumulator by storing the data processed by the data processing apparatus 300. In addition, the memory 310 may store applications, drivers, etc. to be driven by the data processing apparatus 300. For example, the memory 310 may be an on-chip memory that is responsible for a cache function to process an operation.

For example, the memory 310 may include random access memory (RAM) such as dynamic random access memory (DRAM), static random access memory (SRAM), read-only memory (ROM), electrically erasable programmable read-only memory (EEPROM), a hard disk drive (HDD), a solid state drive (SSD), and/or a flash memory.

The processor 320 may control the overall functions for driving the neural network in the data processing apparatus 300. For example, the processor 320 may execute programs stored in the memory 310 to generally control the data processing apparatus 300. The processor 320 may be implemented as a central processing unit (CPU), a graphics processing unit (GPU), an application processor (AP), etc. provided in the data processing apparatus 300, but is not limited thereto.

The processor 320 may read/write data (e.g., voice data, image data, feature map data, kernel data, etc.) from/to the memory 310 and process the operation of the neural network using the read/written data. In addition, the processor 320 may read/write voice data from/to the memory 310 and process an operation for ASR using the read/written data.

The processor 320 may include a processing element for processing an operation. For example, the processing element may include a logic circuit for the operation. For example, the processing element may include an operator implemented as a combination of a multiplier and an adder. Alternatively, the processing element may include an operator implemented as a combination of a multiplier, an adder, and an accumulator. Also, the multiplier may be implemented as a combination of multiple sub-multipliers, and the adder may also be implemented as a combination of multiple sub-adders.

The processor 320 may further include a dispatcher for dispatching operands. For example, the dispatcher may dispatch the operands used for operations to be performed by the processing element from the data stored in the memory 310 to the memory 310. The dispatcher may then dispatch back to the processing element to compute the operands dispatched to the memory 310.

Hereinafter, embodiments relating to a method in which the data processing apparatus 300 processes data will be described with reference to FIGS. 4 to 19. The contents described with respect to the data processing apparatus 300 shown in FIG. 3 may be applied to the embodiments described below.

FIG. 4 is a flowchart illustrating a method of processing data according to one or more embodiments.

The method of processing data in FIG. 4 shows a method in which the data processing apparatus 300 may implement an activation function. In one or more embodiments, the activation function may include a division operation.

In operation 410, the processor 320 may normalize input data of the activation function including the division operation.

The input data may be data used as an input of the activation function. The processor 320 may normalize the input data by performing a pre-processing process for normalizing the input data to a specific rule. For example, the processor 320 may normalize the input data such that the maximum and/or minimum values of the input data are included in a preset range. For another example, the processor 320 may normalize the input data such that the maximum and/or minimum values of the input data are preset values.

In operation 420, the processor 320 may obtain (e.g., determine) dividend data corresponding to the dividend of the division operation by reading the value of a first lookup table addressed by the normalized input data from the memory 310.

The processor 320 may obtain the dividend data by reading the value of the first lookup table addressed by the normalized input data. The dividend data may be data corresponding to the dividend of the division operation. The dividend data may not have the same value as the dividend of the division operation.

In operation 430, the processor 320 may obtain divisor data corresponding to the divisor of the division operation by accumulating the dividend data.

The processor 320 may obtain the divisor data by accumulating the dividend data using an accumulator or an adder included in the processing element. Alternatively, the processor 320 may obtain the divisor data by accumulating the dividend data using an accumulator included in the memory 310.

The processor 320 may obtain the divisor data by accumulating the dividend data instead of directly calculating the divisor of the division operation. The divisor data may be data corresponding to the divisor of the division operation. The divisor data may not have the same value as the divisor of the division operation.

In operation 440, the processor 320 may obtain output data of the activation function from an output of the division operation obtained by reading the values of a second lookup table addressed by the dividend data and the divisor data from the memory 310.

Instead of using a divider, the processor 320 may obtain the output of the division operation by reading the values of the second lookup table addressed by the dividend data and the divisor data. The processor 320 may obtain output data from the output of the division operation. The output data may be the output of the activation function.

In another embodiment, operation 410 of normalizing the input data may be omitted. The values of the first and second lookup tables may be finely tuned instead of the normalization of the input data such that the output of the division operation of the activation function may be obtained in a low error range.

Figure 5A:
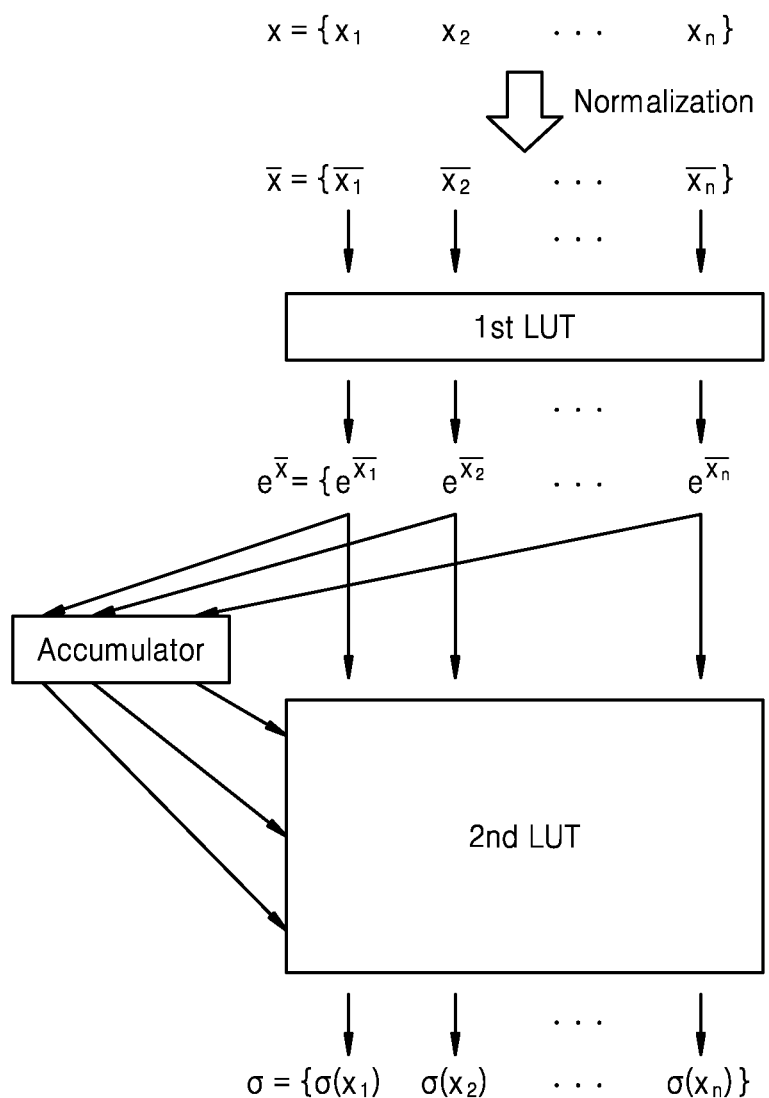
FIGS. 5A and 5B illustrate a method of a data processing apparatus to implement a Softmax function according to one or more embodiments.
Figure 5B:
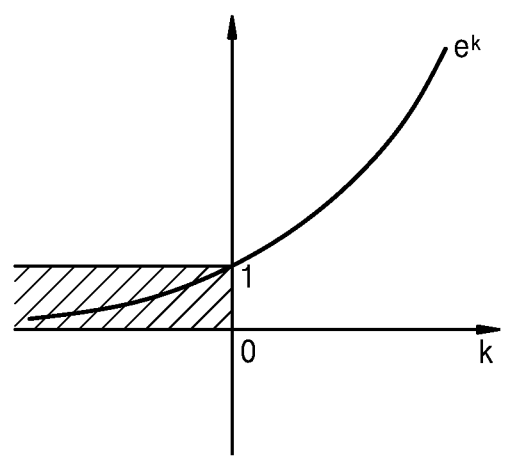

FIGS. 5A and 5B are diagrams illustrating a method of a data processing apparatus to implement a Softmax function according to one or more embodiments.

The Softmax function may be an activation function, which may be used to implement a neural network and/or an ASR. In an example, the Softmax function may correspond to the Softmax function of Equation 1 described above. The Softmax function may be expressed as Equation 2 below, for example.

$$\sigma(x_i) = \frac{e^{x_i}}{\sum_j e^{x_j}}$$

Equation 2

Referring to FIGS. 5A and 5B, the processor 320 may normalize input data x. In one or more embodiments, the processor 320 may normalize the input data x such that the maximum value of normalized input data $\bar{x}$ is 0. In one or more embodiments, the processor 320 may normalize the input data x based on Equation 3 below, for example.

$$\bar{x} = x - \max(x)$$

Equation 3:

In Equation 3, $\bar{x}$ indicates the normalized input data, x indicates the input data, and max(x) indicates the maximum value of the input data.

When the maximum value of the normalized input data $\bar{x}$ is 0, the result value of performing an exponential operation on the normalized input data $\bar{x}$ is included in a shaded area in a graph of FIG. 5B. That is, the dividend data $e^{\bar{x}}$ is included in the range of 0 to 1.

The result value of the exponential operation on the input data x is included in the range of 0 to ∞, whereas the result value of performing an exponential operation on the normalized input data $\bar{x}$ is included in the range of 0 to 1, and thus, the dividend of the Softmax function with regard to the input data x is included in the range of 0 to ∞, whereas the dividend data $e^{\bar{x}}$ is included in the range of 0 to 1. Therefore, because the dividend data $e^{\bar{x}}$ is distributed in the range of 0 to 1, the values of the first lookup table may be stabilized in limited range. For example, while a typical data processing apparatus may implement a lookup table having values in the range of 0 to ∞, a data processing apparatus of one or more embodiments may implement a first lookup table having values of the dividend data $e^{\bar{x}}$ of the normalized input data $\bar{x}$ distributed in the range of 0 to 1, such that a size of a memory space (e.g., of the memory 310) used to store the first lookup table implemented by the data processing apparatus of one or more embodiments is advantageously reduced compared to a size of a memory space used to store the first lookup table implemented by the typical data processing apparatus.

The processor 320 may obtain (e.g., determine) the dividend data $e^{\bar{x}}$ corresponding to the dividend of the Softmax function by reading the value of the first lookup table 1st LUT addressed by the normalized input data R. The dividend of the Softmax function may correspond to $e^{x_i}$ in Equation 2 above, for example.

For example, when the input data x is a vector including n elements $x_1, x_2, \ldots, x_n$, the processor 320 may obtain the dividend data $e^{\bar{x}}$ including n elements $e^{\bar{x}_1}, e^{\bar{x}_2}, \ldots, e^{\bar{x}_n}$ by n times reading the value of the first lookup table addressed by the normalized input data $\bar{x}$ from the memory 310.

The processor 320 may obtain the divisor data corresponding to the divisor of the Softmax function by accumulating the dividend data $e^{\bar{x}}$. The divisor of the Softmax function may correspond to $\sum_j e^{x_j}$ in Equation 2 above, for example.

For example, when the input data x is the vector including the n elements $x_1, x_2, \ldots, x_n$, and the dividend data $e^{\bar{x}}$ including the n elements $e^{\bar{x}_1}, e^{\bar{x}_2}, \ldots, e^{\bar{x}_n}$ is obtained, the processor 320 may obtain the divisor data by accumulating the n elements $e^{\bar{x}_1}, e^{\bar{x}_n}, \ldots, e^{\bar{x}_2}$ of the dividend data $e^{\bar{x}}$.

The processor 320 may obtain output data a of the Softmax function by reading the values of the second lookup table 2nd LUT addressed by the dividend data $e^{\bar{x}}$ and the divisor data from the memory 310. That is, the processor 320 may obtain the output of the division operation by reading the values of the second lookup table 2nd LUT addressed by the dividend data $e^{\bar{x}}$ and the divisor data from the memory 310 instead of directly performing the division operation of the Softmax function. The output of the Softmax function may correspond to $\sigma(x_i)$ in Equation 2 above, for example. That is, the output data a may correspond to $\sigma(x_i)$ in Equation 2 above, for example.

For example, when the input data x is the vector including the n elements $x_1, x_2, \ldots, x_n$, and the dividend data $e^{\bar{x}}$ including the n elements $e^{\bar{x}_1}, e^{\bar{x}_2}, \ldots, e^{\bar{x}_n}$ is obtained, the processor 320 may obtain the output data a including n elements $\sigma(x_1), \sigma(x_2), \ldots, \sigma(x_n)$ by n times reading the value of the second lookup table addressed by the dividend data $e^{\bar{x}}$ and the divisor data from the memory 310.

When the input data x is normalized such that the maximum value is 0, the dividend data $e^{\bar{x}}$ may be included in the range of 0 to 1 regardless of the range of the input data $e^{\bar{x}}$. Therefore, the range of the value of the divisor data obtained by accumulating the dividend data $e^{\bar{x}}$ depends on the length of the input data x.

In the data processing method according to one or more embodiments, the processor 320 may obtain the output of the activation function through an n-cycle operation of reading the values of the first lookup table and an n-cycle operation of reading the value of the second lookup table. Accumulation of the dividend data may be performed in the same cycle as reading of the value of the first lookup table, and thus the processor 320 may compute the activation function through a 2n-cycle operation.

In order to implement the neural network and/or ASR, an activation function including the division operation may be processed. To process the activation function, a typical data processing apparatus may use a dedicated operator to implement the division operation. For example, when the Softmax function includes the division operation, the typical data processing apparatus may use a divider to implement the division operation. The dedicated operator of the typical data processing apparatus used for the activation function may have no-reconfigurability, and the divider may cause latency in the operation.

In contrast, the data processing apparatus 300 of one or more embodiments may process the activation function including the division operation using a look-up table (e.g., either one or both of the first lookup table and the second lookup table). Therefore, the data processing apparatus 300 of one or more embodiments may not use a dedicated operator to process the activation function, and may be configured to be reconfigurable. Also, because the data processing apparatus 300 may not use a divider to implement the division operation, there may be no latency caused by such a divider, thereby improving the functioning of computers and the technology fields of data processing, neural network processing, and ASR.

FIG. 6 illustrates a precision of a lookup table according to one or more embodiments.

The precision with which the processor 320 (and/or a neural processor or neural processing unit (NPU)) computes calculates, or implements an activation function may vary. For example, the processor 320 may calculate the activation function with precision of floating point (FP) 32, integer (INT) 16, INT8, or unsigned integer (UINT) 8.

A plurality of lookup tables 600 previously generated to have various precisions may be stored in the memory 310. The plurality of lookup tables 600 may include 1D lookup tables 1D_LUT . . . for use as a first lookup table and 2D-lookup tables 2D_LUT . . . for use as a second lookup table.

For example, the memory 310 may store a plurality of lookup tables 610 with precision of FP10 in correspondence to precision of FP32 of an NPU, a plurality of lookup tables 620 with precision of INT16 in correspondence to precision of INT16 of the NPU, a plurality of lookup tables 630 with precision of INT8 in correspondence to precision of INT8 of the NPU, and a plurality of lookup tables 640 with precision of UINT8 in correspondence to precision of UINT8 of the NPU. The processor 320 may include the NPU.

Various lookup tables with the same precision may be stored in the memory 310. For example, lookup tables with the same precision and different lengths (columns/rows) and sizes (bits/bytes) may be stored in the memory 310. For example, a 1D lookup table 1D_LUT_1×31 of 31 columns with precision of FP10, a 1D lookup table 1D_LUT_1×61 of 61 columns, etc. may be stored in the memory 310. For example, a 2D-lookup table 2_D_LUT_11×20 of 275 bytes with precision of FP10, a 2D-lookup table 2_D_LUT_11×40 of 550 bytes, etc. may be stored in the memory 310.

The processor 320 may select a first lookup table and a second lookup table from among the plurality of lookup tables 600 according to precision with which an operation is to be performed. Also, the processor 320 may select the first lookup table and the second lookup table to have the same precision or different precisions. For example, the processor 320 may select a 1D lookup table 1D_LUT_1×101_int8 with precision of INT8 as the first lookup table, and a 2D-lookup table 2_D_LUT_11×60_int8 with precision of INT8 as the second lookup table. For example, the processor 320 may select the 1D lookup table 1D_LUT_1×61 with precision of FP10 as the first lookup table, and the 2D-lookup table 2_D_LUT_11×60_int8 with precision of INT8 as the second lookup table.

The plurality of lookup tables 600 may be stored in DRAM, and the first and second lookup tables selected according to precision may be moved to and stored in SRAM. When the first lookup table and the second lookup table to be used for the calculation of the activation function are stored in the SRAM, the processor 320 may read the values of the first lookup table and the second lookup table from the memory 310 at a high speed.

Figures 7, 8:
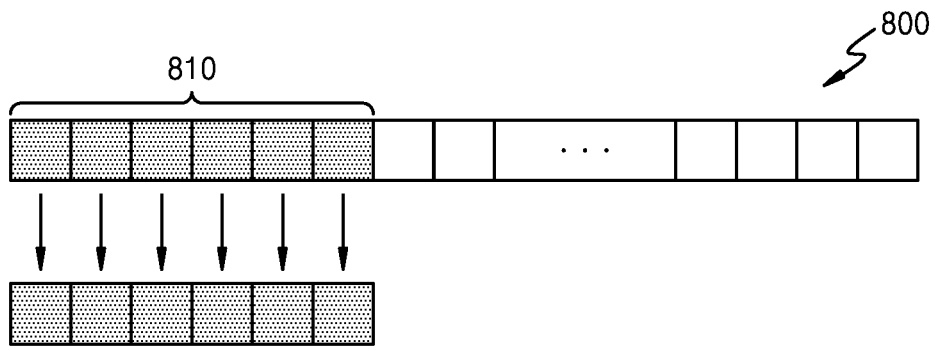
FIG. 7 illustrates lookup tables according to one or more embodiments.
FIG. 8 illustrates a method of determining a row-index according to one or more embodiments.

FIG. 7 illustrates lookup tables according to one or more embodiments.

In one or more embodiments, a 1D lookup table 1D_LUT_1×101_uint8 with precision of UINT8 may be generated as shown in FIG. 7. The 1D lookup table 1D_LUT_1×101_uint8 may have 101 columns.

The value of the 1D lookup table 1D_LUT_1×101_uint8 may be a value corresponding to a result of performing an exponential operation on normalized input data. When the input data is normalized such that the maximum value is 0, the result of performing the exponential operation on the normalized input data is included in the range of 0 to 1. Therefore, the 1D lookup table 1D_LUT_1×101_uint8 may be generated to express the range of 0 to 1 with precision of UINT8.

The processor 320 may obtain (e.g., determine) dividend data by obtaining a column-index addressing the columns of the 1D lookup table 1D_LUT_1×101_uint8 based on the value of the normalized input data, and reading the value of the 1D lookup table 1D_LUT_1×101_uint8 with reference to the column-index.

In one or more embodiments, a 2D-lookup table 2_D_LUT_11×60_uint8 with precision of UINT8 may be generated as shown in FIG. 7. The 2D-lookup table 2_D_LUT_11×60_uint8 may have 11 rows and 60 columns.

The processor 320 may obtain a column-index addressing the columns of the 2D-lookup table 2_D_LUT_11×60_uint8 based on the value of the normalized input data, and obtain a row-index addressing the rows of the 2D-lookup table 2_D_LUT_11×60_uint8 based on the value of divisor data. The processor 320 may obtain output data of the activation function by reading the values of the 2D-lookup table 2_D_LUT_11×60_uint8 with reference to the column-index and the row-index.

FIG. 8 illustrates a method of determining a row-index according to one or more embodiments.

The processor 320 may obtain the row-index addressing rows of a second lookup table based on the value of divisor data. For example, the processor 320 may obtain divisor data by accumulating dividend data using an accumulator 800, and the processor 320 may obtain the row-index from certain bits of the accumulator 800 (e.g., certain bits of the accumulated dividend data).

The processor 320 may obtain the row-index from a specific or determined number of most significant bits 810 of the accumulator 800. The processor 320 may determine the specific number based on the number of rows in the second lookup table.

The processor 320 may determine the specific number based on a value of log of the number of rows of the second lookup table with a base of 2. For example, the processor 320 may determine the specific number based on the value of an index of the log of the number of rows of the second lookup table with the base of 2. The processor 320 may determine the specific number by adding 1 to the value of the index of the log of the number of rows of the second lookup table with the base of 2.

For example, when the number of rows of the second lookup table is 30, because the value of $\log_2 30$ is about 4.91, the processor 320 may determine 5 which is a value obtained by adding 1 to the index 4 as the specific number, and may obtain the row-index from 5 most significant bits of the accumulator 800. For example, when the number of rows of the second lookup table is 60, because the value of $\log_2 60$ is about 5.91, the processor 320 may determine 6 which is a value obtained by adding 1 to the index 5 as the specific number, and may obtain the row-index from 6 most significant bits of the accumulator 800.

Figure 9A:
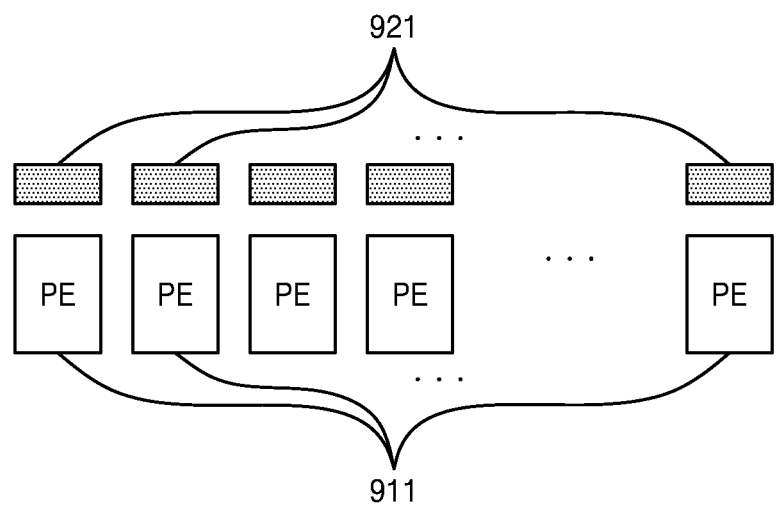
FIGS. 9A and 9B illustrate an architecture of a data processing apparatus according to one or more embodiments.
Figure 9B:
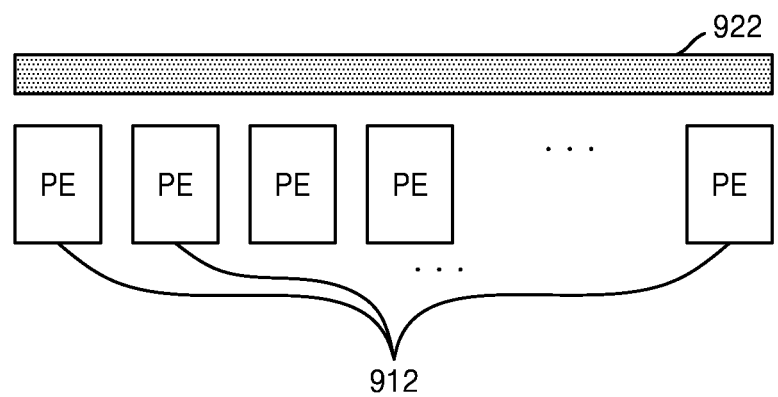

FIGS. 9A and 9B are diagrams illustrating an architecture of a data processing apparatus (e.g., the data processing apparatus 300) according to one or more embodiments.

Referring to FIGS. 9A and 9B, processing elements 911 and 912 of the data processing apparatus 300 may include an operator implemented as a combination of a multiplier and an adder. Alternatively or additionally, the processing elements 911 and 912 may include an operator implemented as a combination of a multiplier, an adder, and an accumulator. The processor 320 may include the processing elements 911 and 912.

Dedicated reconfigurable memories 921 and 922 may be allocated to the processing elements 911 and 912. For example, the dedicated memory 921 may be allocated one-to-one to the processing element 911, or the dedicated memory 922 may be allocated many-to-one to the processing elements 912. The memory 310 may include the dedicated memories 921 and 922.

When the processing elements 911 and 912 include the accumulator, the processing elements 911 and 912 may obtain divisor data by accumulating dividend data. Alternatively, the dedicated memories 921 and 922 may obtain the divisor data by accumulating the dividend data.

A first lookup table and a second lookup table may be stored in the dedicated memories 921 and 922. The processor 320 may read the values of the first lookup table and the values of the second lookup table from the dedicated memories 921 and 922.

The dedicated memories 921 and 922 may have a size enough to store the first lookup table and the second lookup table. For example, the dedicated memory 921 allocated one-to-one to the processing element 911 may be 256 bytes. For example, the dedicated memory 922 allocated many-to-one to the processing element 912 may be 32 Kbytes.

The dedicated memories 921 and 922 allocated to the processing elements 911 and 912 may be SRAM such that the processor 320 may read the first and second lookup tables at a high speed.

The processor 320 may perform an operation between the activation and weight of a neural network using the processing elements 911 and 912, and may perform a division operation of the activation function using the dedicated memories 921 and 922. For example, the processor 320 may perform a convolution operation between the activation and the weight using the processing elements 911 and 912, and may perform the division operation of the activation function by reading the first lookup table and the second lookup table from the dedicated memories 921 and 922.

In addition, the processor 320 may perform a dot-product operation of a scaled dot-product attention function for implementing an end-to-end ASR using the processing elements 911 and 912, and may perform the operation of a Softmax function using the dedicated memories 921 and 922.

FIG. 10 illustrates an accuracy of an operation of a data processing apparatus according to one or more embodiments.

An experiment was conducted to measure an accuracy of speech recognition on an end-to-end ASR model based on a scaled dot-product attention function. The experiment was conducted on 1000 short samples of LibriSpeech dataset and about 2000 samples of commercial dataset. Short samples are samples with 10 or less words per sentence rate (WPSR).

In the experiment, the accuracy of speech recognition was compared between a typical reference model 1010 calculating a Softmax function according to a conventional method of precision of FP64 (using a dedicated operator to implement a division operation of the Softmax function and/or without use of the first and second lookup tables as described above according to one or more embodiments) and proposed models of one or more embodiments calculating the Softmax function according to the method shown in FIG. 5. The accuracy of speech recognition was calculated based on a word error rate (WER) and a sentence error rate (SER).

The proposed models of one or more embodiments are configured to calculate the Softmax function using a first lookup table and a second lookup table of different lengths (rows/columns) with precision of FP10. For example, a first proposal model 1020 is configured to use a first lookup table with 31 columns and a second lookup table with 40 rows and 11 columns, a second proposal model 1030 is configured to use a first lookup table with 61 columns and a second lookup table with 60 rows and 11 columns, and a third proposed model 1040 is configured to use a first lookup table with 101 columns and a second lookup table in with 60 rows and 11 columns.

As a result of the experiment, the WER of the proposed models of one or more embodiments was only increased by about 0.05 to 0.5% compared to the typical reference model 1010. In addition, the SER of the proposed models was only increased by about 0.1-2% compared to the typical reference model 1010. For example, in the case of the first proposed model 1020 using the first and second lookup tables with the size of 600 bytes or less, the WER was only increased by about 0.2 to 0.5% compared to the typical reference model 1010. Therefore, when the proposed models of one or more embodiments are used, accurate speech recognition may be smoothly performed using less hardware resources than the typical reference model 1010, thereby improving the functioning of computers and the technology fields of data processing, neural network processing, and ASR.

FIG. 11 illustrates an accuracy of an operation of a data processing apparatus according to one or more embodiments.

An experiment was conducted to measure an accuracy of speech recognition of proposed models of one or more embodiments using first and second lookup tables of the same precision and proposed models of one or more embodiments using first and second lookup tables of different precisions. FIG. 11 shows experimental results of measuring the accuracy of the proposed models based on the typical reference model 1010 described above with reference to FIG. 10.

The proposed models of one or more embodiments include a case full_int16 that selects the 1D lookup table 1D_LUT_1×101_int16 with precision of INT16 as the first lookup table and the 2D-lookup table 2_D_LUT_11×60_int16 with precision of INT16 as the second lookup table, a case full_uint8 that selects the 1D lookup table 1D_LUT_1×101_uint8 with precision of UINT8 as the first lookup table and the 2D-lookup table 2_D_LUT_11×60_uint8 with precision of UINT8 as the second lookup table, and a case full_int8 that selects the 1D lookup table 1D_LUT_1×101_int8 with precision of INT8 as the first lookup table and the 2D-lookup table 2_D_LUT_11×60_int8 with precision of INT8 as the second lookup table.

In addition, the proposed models of one or more embodiments include a case mix_16_8 that selects the 1D lookup table 1D_LUT_1×101_int16 with precision of INT16, etc. as the first lookup table and the 2D-lookup table 2_D_LUT_11×60_int8 with precision of INT8, etc. as the second lookup table.

As a result of the experiment, it may be confirmed that the WER of the proposed models of one or more embodiments only has a difference of 0 to 1% compared to the typical reference model 1010. Therefore, when the proposed models of one or more embodiments are used, speech recognition may be performed with accuracy similar to the typical reference model 1010 while using less hardware resources than the typical reference model 1010, thereby improving the functioning of computers and the technology fields of data processing, neural network processing, and ASR.

Figure 12:
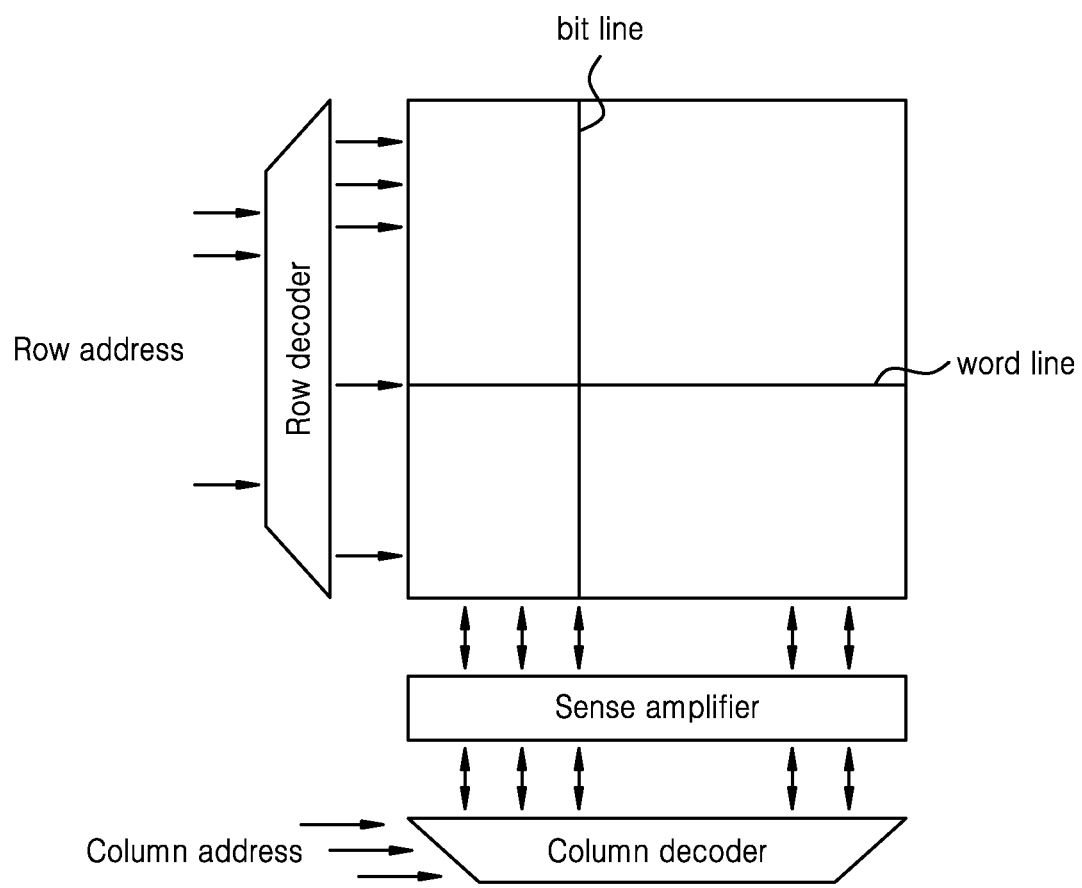
FIG. 12 illustrates a method used by a data processing apparatus to read a value of a lookup table using dynamic random access memory (DRAM) according to one or more embodiments.

FIG. 12 illustrates a method in which a data processing apparatus reads a value of a lookup table using DRAM according to one or more embodiments.

The processor 320 may read a 2D-lookup table from the memory 310. The processor 320 may use a 2D-lookup table stored in SRAM in one or more embodiments, but in another embodiment, the processor 320 may use a 2D-lookup table stored in DRAM.

The processor 320 may read the value of the 2D-lookup table by selecting a word line of the DRAM addressed by a row-index of the 2D-lookup table and a bit line of the DRAM addressed by a column-index of the 2D-lookup table.

Because it is only required to select the word line of the DRAM one time to read the values from the 2D-lookup table, even when using DRAM instead of SRAM, the value of the 2D-lookup table may be obtained at a relatively high speed.

Figure 13:
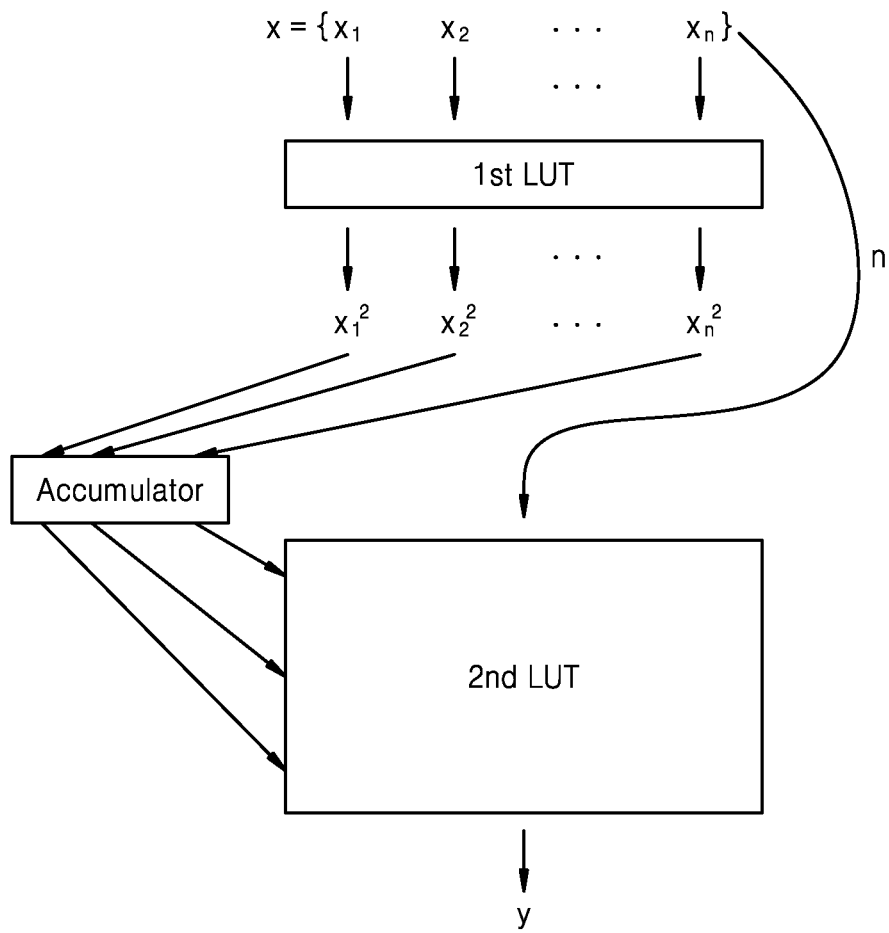
FIG. 13 illustrates a method used by a data processing apparatus to compute a part of layer normalization function according to one or more embodiments.

FIG. 13 illustrates a method in which a data processing apparatus computes a part of a layer normalization function according to one or more embodiments.

The part of layer normalization function may be expressed as Equation 4 below, for example.

$$y = \sqrt{\frac{\sum x_i^2}{n}}$$ Equation 4

In Equation 4, y denotes the part of the layer normalization function corresponding to output data, x denotes input data, and n denotes the number of elements of x.

The processor 320 may obtain squares $x_1^2, x_2^2, \ldots, x_n^2$ of elements of the input data x by reading the value of the first lookup table 1st LUT addressed by the input data x from the memory 310. The processor 320 may obtain a sum of the squares $x_1^2, x_2^2, \ldots, x_n^2$ of the elements of the input data x by accumulating the squares $x_1^2, x_2^2, \ldots, x_n^2$ of the elements of the input data x. The sum of the squares $x_1^2, x_2^2, \ldots, x_n^2$ of the elements of the input data x may correspond to $\Sigma x_i^2$ in Equation 4. The processor 320 may obtain the output data corresponding to the part of the layer normalization function by reading the value of the second look-up table 2nd LUT addressed by the sum of the squares $x_1^2, x_2^2, \ldots, x_n^2$ of the elements of the input data x and the number n of the elements of the input data x from the memory 310.

Figure 14:
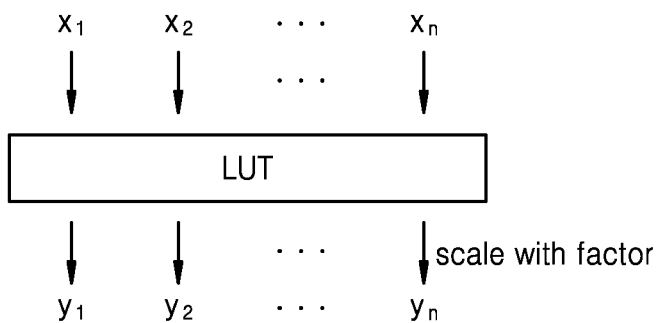
FIG. 14 illustrates a method used by a data processing apparatus to compute a non-linear function according to one or more embodiments.

FIG. 14 illustrates a method in which a data processing apparatus computes a non-linear function according to one or more embodiments.

The processor 320 may compute the non-linear function on input data by reading the value of a lookup table addressed by the input data from the memory 310. That is, the processor 320 may compute the non-linear function on the input data by reading the value of the lookup table instead of directly computing the non-linear function on the input data.

In one or more embodiments, the processor 320 may obtain the value of a hyperbolic tangent on input data $x_1, x_2, \ldots, x_n$ by reading the value of the look-up table LUT addressed by the input data $x_1, x_2, \ldots, x_n$. Further, the processor 320 may obtain data $y_1, y_2, \ldots, y_n$ obtained by inversely quantizing the value of the hyperbolic tangent by scaling the obtained value of the hyperbolic tangent.

FIG. 15 illustrates a method in which a data processing apparatus performs a multiplication operation according to one or more embodiments.

The processor 320 may perform the multiplication operation by reading the value of a 2D-lookup table from the memory 310.

In one or more embodiments, the 2D-lookup table may include a product between numbers that are expressible in 4 bits. The 2D-lookup table may be a lookup table of 16 rows and 16 columns. Accordingly, the processor 320 of one or more embodiments may obtain the product between the numbers by reading the value of the 2D-lookup table, instead of directly computing the multiplication between the numbers (e.g., using a dedicated multiplier).

FIG. 16 illustrates a method in which a data processing apparatus performs a multiplication operation according to one or more embodiments.

In the multiplication operation, even though the order between factors changes, because the product does not change, the processor 320 may perform the multiplication operation by reading the value of a 2D-lookup table illustrated in FIG. 16 instead of the 2D-lookup-table illustrated in FIG. 15. By using the 2D-lookup table of FIG. 16, storage space of the memory 310 may be saved.

FIG. 17 illustrates a method in which a data processing apparatus performs a multiplication operation according to one or more embodiments.

The processor 320 may perform the multiplication operation between numbers expressed in different bits by reading the value of a 2D-lookup table from the memory 310. In one or more embodiments, the processor 320 may obtain a multiplication result between a number that are expressible in 4 bits and a number that are expressible in 8 bits by reading the value of the 2D-lookup table.

Figure 18A:
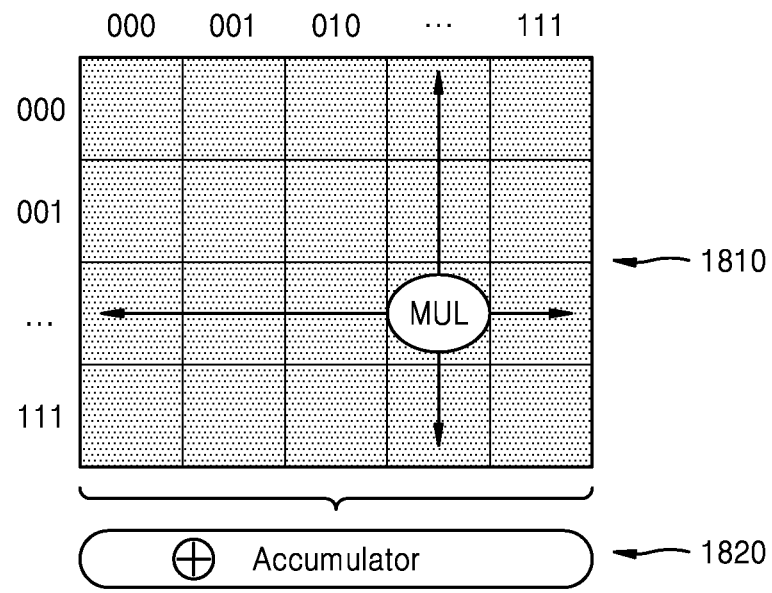
FIGS. 18A and 18B illustrate a method used by a data processing apparatus to perform a multiply-accumulate (MAC) operation according to one or more embodiments.
Figure 18B:
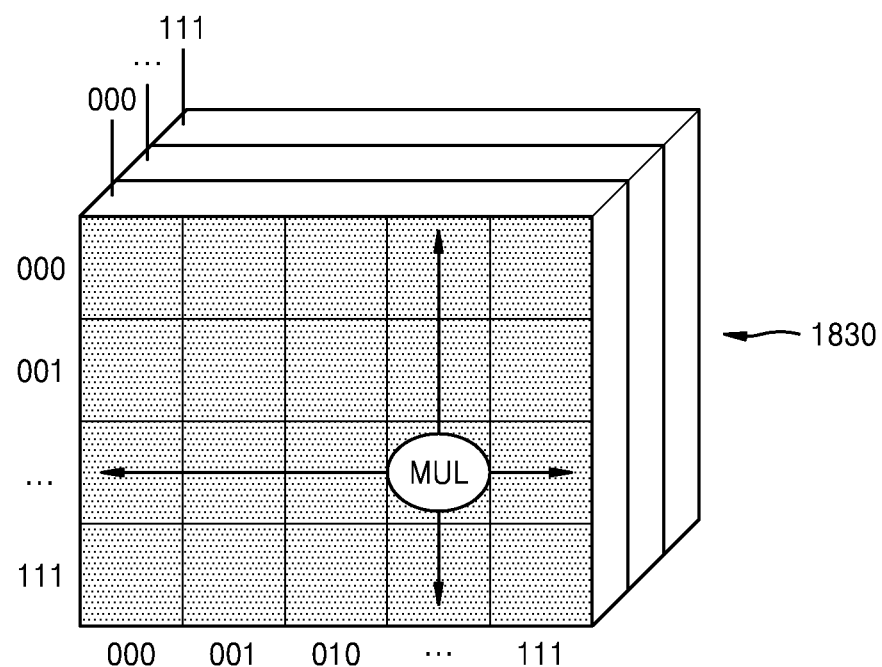

FIGS. 18A and 18B illustrate a method in which a data processing apparatus performs a multiply-accumulate (MAC) operation according to one or more embodiments.

The processor 320 may perform the MAC operation. In one or more embodiments, the processor 320 may perform a multiplication operation by reading the value of a 2D-lookup table 1810 from the memory 310, and perform the MAC operation by performing an addition operation using an accumulator 1820. In another embodiment, the processor 320 may perform the MAC operation by reading the value of a 3D-lookup table 1830.

Figure 19:
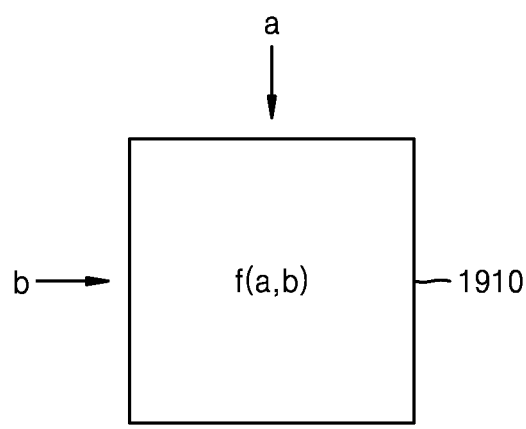
FIG. 19 illustrates a method used by a data processing apparatus to process an arbitrary function according to one or more embodiments.

FIG. 19 illustrates a method in which a data processing apparatus processes an arbitrary function according to one or more embodiments.

The processor 320 may process the arbitrary function by reading a lookup table from the memory 310. The arbitrary function may be a linear function or a non-linear function. The arbitrary function may include a linear operation or a non-linear operation.

In one or more embodiments, the processor 320 may obtain output data f(a,b) of the arbitrary function f on input data a and b by reading the value of a 2D-lookup table 1910 from the memory 310. The processor 320 may obtain the output data f(a,b) of the function instead of directly calculating the function by using a lookup table of various dimensions such as 1 D, 2D, and 3D.

The data processing apparatuses, memories, processors, accumulators, processing elements, NPUs, data processing apparatus 300, memory 310, processor 320, accumulator 800, processing element 911, processing element 912, memory 921, memory 922, accumulator 1820, and other apparatuses, devices, units, modules, and components described herein with respect to FIGS. 1-19 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented data processing method, the method comprising:
    normalizing input data of an activation function, the activation function comprising a division operation;
    based on a precision of the activation function, selecting a first lookup table from a first set of first lookup tables;
    determining dividend data corresponding to a dividend of the division operation by reading, from a memory, a value of the selected first lookup table addressed by the normalized input data;
    determining divisor data corresponding to a divisor of the division operation by accumulating the dividend data using an accumulator;
    based on the precision of the activation function, selecting a second lookup table from a second set of second lookup tables; and
    determining output data of the activation function corresponding to a quotient output of the division operation obtained by reading, from the memory, a quotient value from the selected second lookup table, the quotient value addressed by a column-index value determined by the dividend data and addressed by a row-index value determined by a determined number of most significant bits of the accumulator, wherein the second lookup table comprises a column-index corresponding to dividends, a row-index corresponding to divisors, and quotient values, including the quotient value, indexed by the column-index and the row-index.

2. The method of claim 1, wherein the normalizing comprises normalizing the input data such that a maximum value of the normalized input data is 0.

3. The method of claim 1, wherein the determining of the output data comprises:
    determining the column-index value based on a value of the dividend data;
    determining the row-index value based on a value of the divisor data; and
    reading, from the memory, the quotient value from the second lookup table addressed by the column-index value and the row-index value.

4. The method of claim 3, wherein
    the determining of the row-index value comprises determining the row-index value from a value indicated by the determined number of the most significant bits.

5. The method of claim 4, wherein the determining of the row-index value comprises determining the number of most significant bits based on a value of a log base 2 of a total number of rows of the second lookup table.

6. The method of claim 5, wherein the determining of the number of the most significant bits comprises adding 1 to the value of the log base 2 of the total number of rows of the second lookup table.

7. The method of claim 3, wherein the determining of the output data comprises reading the quotient value from the second lookup table by selecting a word line of the memory addressed by the row-index value.

8. The method of claim 1, further comprising:
    selecting the first lookup table and the second lookup table based on previously generated associations between precisions and lookup tables.

9. The method of claim 8, wherein the selecting of the first lookup table and the second lookup table comprises:
    selecting the first lookup table and the second lookup table such that the first lookup table and the second lookup table correspond to different precisions.

10. The method of claim 1, wherein the activation function comprises a Softmax function.

11. The method of claim 1, wherein a number of operation cycles of reading values of the first lookup table for determining the dividend data is the same as a number of operation cycles of reading values of the second lookup table for determining the output data.

12. A non-transitory computer-readable storage medium storing instructions that, when executed by a processor, configure the processor to perform the method of claim 1.

13. A data processing apparatus, the apparatus comprising:
    a memory storing instructions; and
    one or more processors configured by the instructions to:
        normalize input data of an activation function, the activation function comprising a division operation;
        based on a precision of the activation function, select a first lookup table from a first set of first lookup tables;
        determine dividend data corresponding to a dividend of the division operation by reading, from the memory, a value of the selected first lookup table addressed by the normalized input data;
        determine divisor data corresponding to a divisor of the division operation by accumulating the dividend data using an accumulator;
        based on the precision of the activation function, select a second lookup table from a second set of second lookup tables; and
        determine output data of the activation function corresponding to a quotient output of the division operation obtained by reading, from the memory, a quotient value from the selected second lookup table, the quotient value addressed by a column-index value determined by the dividend data and addressed by a row-index value determined by a determined number of most significant bits of the accumulator, wherein the second lookup table comprises a column-index corresponding to dividends, a row-index corresponding to divisors, and quotient values, including the quotient value, indexed by the column-index and the row-index.

14. The apparatus of claim 13, wherein, for the normalizing, the one or more processors are configured to normalize the input data such that a maximum value of the normalized input data is 0.

15. The apparatus of claim 13, wherein, for the determining of the output data, the one or more processors are configured to:
    determine the column-index value based on a value of the dividend data;
    determine the row-index value based on a value of the divisor data; and read, from the memory, the quotient value from the second lookup table addressed by the column-index value and the row-index value.

16. The apparatus of claim 15, wherein, for the determining of the row-index value, the one or more processors are configured to determine the row-index value from a value indicated by the determined number of the most significant bits.

17. The apparatus of claim 16, wherein, for the determining of the row-index value, the one or more processors are configured to determine the number of most significant bits based on a value of a log base 2 of a total number of rows of the second lookup table.

18. The apparatus of claim 15, wherein
the memory comprises dynamic random access memory (DRAM) in which the second lookup table is stored, and
for the determining of the output data, the one or more processors are configured to read the value from the second lookup table by selecting a word line of the DRAM addressed by the row-index value.

19. The apparatus of claim 13, wherein the one or more processors are configured to:
select the first lookup table and the second lookup table based on previously generated associations between precisions and lookup tables.

20. The apparatus of claim 19, wherein, for the selecting of the first lookup table and the second lookup table, the one or more processors are configured to select the first lookup table and the second lookup table such that the first lookup table and the second lookup table correspond to different precisions.

21. A processor-implemented data processing method, the method comprising:
based on a precision of an activation function, selecting a first lookup table from a first set of first lookup tables;
determining dividend data corresponding to a dividend of the activation function by reading, from a memory, a value of the selected first lookup table based on input data of the activation function;
determining divisor data corresponding to a divisor of the activation function by accumulating the dividend data using an accumulator;
based on the precision of the activation function, selecting a second lookup table from a second set of second lookup tables; and
determining output data corresponding to an output of the activation function by reading, from the memory, a quotient value from the selected second lookup table based on a column-index value determined by the dividend data and a row-index value determined by a determined number of most significant bits of the accumulator, wherein the second lookup table comprises a column-index corresponding to dividends, a row-index corresponding to divisors, and quotient values, including the quotient value, indexed by the column-index and the row-index.

22. The method of claim 21, further comprising:
normalizing the input data,
wherein the determining of the dividend data comprises reading, from the memory, the value of the first lookup table addressed by the normalized input data.

23. The method of claim 21, wherein
the processor is configured to perform automatic speech recognition based on the determined output data, and
the activation function corresponds to an attention function.

24. A processor-implemented data processing method, the method comprising:
normalizing input data of an activation function, the activation function comprising a dividend and a divisor;
based on a precision of the activation function, selecting a first lookup table from a first set of first lookup tables;
determining dividend data by reading, from the selected first lookup table of one or more memories, a value of a column-index corresponding to a value of the normalized input data;
determining divisor data by accumulating the dividend data using an accumulator;
based on the precision of the activation function, selecting a second lookup table from a second set of second lookup tables; and
determining output data of the activation function by reading, from the selected second lookup table of the one or more memories, a quotient value of a column-index value corresponding to the value of the normalized input data and of a row-index value corresponding to a value of a determined number of most significant bits of the accumulator, wherein the second lookup table comprises a column-index corresponding to dividends, a row-index corresponding to divisors, and quotient values, including the quotient value, indexed by the column-index and the row-index.

25. The method of claim 24, wherein the dividend data is within the range of 0 to 1.

26. The method of claim 24, wherein the first lookup table and the second lookup table are selected based on previously generated associations between precisions and lookup tables.

27. The method of claim 26, wherein the precision is any one of 10-bit floating point, 32-bit floating point, 8-bit integer, 16-bit integer, and 8-bit unsigned integer.

* * * * *